US012639466B2

(12) United States Patent
Goldenberg et al.

(10) Patent No.: US 12,639,466 B2
(45) Date of Patent: May 26, 2026

(54) TECHNIQUES FOR JUST-IN-TIME CONTEXT BASED PERMISSION ACCESS OF COMPUTING RESOURCES

(71) Applicant: Linx Ltd., Tel Aviv (IL)

(72) Inventors: Niv Goldenberg, Brooklyn, NY (US);
Matan Haimovitch, Tel Aviv (IL);
Michael Hekmati, Tel Aviv (IL)

(73) Assignee: Linx Ltd., Tel Aviv (IL)

( * ) Notice: Subject to any disclaimer, the term of this patent is extended or adjusted under 35 U.S.C. 154(b) by 0 days.

(21) Appl. No.: 18/806,918

(22) Filed: Aug. 16, 2024

(65) Prior Publication Data

US 2026/0050680 A1      Feb. 19, 2026

(51) Int. Cl.
G06F 21/62            (2013.01)

(52) U.S. Cl.
CPC .. G06F 21/6218 (2013.01); *G06F 2221/2113* (2013.01); *G06F 2221/2125* (2013.01); *G06F 2221/2137* (2013.01); *G06F 2221/2141* (2013.01)

(58) Field of Classification Search
CPC .................................................. G06F 21/6218
See application file for complete search history.

(56) References Cited

U.S. PATENT DOCUMENTS

| | | | | | |
|---|---|---|---|---|---|
| 9,807,094 | B1 * | 10/2017 | Liu | ....................... | H04L 63/102 |
| 10,326,795 | B2 * | 6/2019 | Brady | ................. | G06F 21/6218 |
| 2004/0186809 | A1 * | 9/2004 | Schlesinger | ............ | G06F 21/62 |
| | | | | | 705/50 |
| 2007/0250920 | A1 * | 10/2007 | Lindsay | ................... | G06F 21/31 |
| | | | | | 726/7 |
| 2010/0107225 | A1 * | 4/2010 | Spencer | .............. | H04W 12/069 |
| | | | | | 726/4 |
| 2011/0277017 | A1 * | 11/2011 | Ivanov | ................... | H04L 63/08 |
| | | | | | 726/4 |
| 2012/0054847 | A1 * | 3/2012 | Schultz | ................. | H04L 9/3213 |
| | | | | | 726/9 |
| 2016/0212115 | A1 * | 7/2016 | Hamlin | ................. | H04L 63/105 |
| 2018/0054460 | A1 * | 2/2018 | Brady | ................... | G06F 21/629 |
| 2019/0278922 | A1 * | 9/2019 | Levin | .................... | G06F 21/604 |
| 2020/0004980 | A1 * | 1/2020 | Blass | ..................... | G06F 16/285 |
| 2020/0304511 | A1 * | 9/2020 | Rathore | .............. | G06F 21/6218 |
| 2021/0312032 | A1 * | 10/2021 | Lee | ......................... | G06F 21/41 |

FOREIGN PATENT DOCUMENTS

| | | | | | |
|---|---|---|---|---|---|
| EP | | 1380916 B1 * | 8/2005 | ......... | G06F 21/6227 |

* cited by examiner

*Primary Examiner* — Ponnoreay Pich
(74) *Attorney, Agent, or Firm* — M&B IP Analysts, LLC

(57) ABSTRACT

A system and method for providing context-based access to managed resources in a computing environment is presented. The method includes detecting a request to access a resource in a computing environment, the request including an action, an identifier of the resource, and an identifier of a principal; determining an access permission required to access the resource; determining an access context based on the identifier of the principal; providing the principal with the access permission to access the resource, in response to determining that a risk score associated with the access context is below a first predetermined threshold; and initiating a remediation action in the computing environment in response to determining that the risk score exceeds a second predetermined threshold.

18 Claims, 4 Drawing Sheets

START

S310
RECEIVE A REQUEST TO ACCESS A RESOURCE

S320
DETERMINE AN ACCESS PERMISSION REQUIRED TO ACCESS THE RESOURCE

S330
DETERMINE AN ACCESS CONTEXT BASED ON THE RECEIVED REQUEST

S340
DETERMINE A RISK SCORE BASED ON THE ACCESS CONTEXT

S350
BELOW THRESHOLD?        NO

YES

PROVIDE ACCESS TO THE RESOURCE

S360
INITIATE REMEDIATION ACTION

TECHNIQUES FOR JUST-IN-TIME CONTEXT BASED PERMISSION ACCESS OF COMPUTING RESOURCES

TECHNICAL FIELD

The present disclosure relates generally to access management in cloud computing environments, specifically for context-based just-in-time access to specific resources in the cloud computing environment.

BACKGROUND

Providing access to resources in a cloud environment poses significant challenges due to the dynamic and distributed nature of cloud infrastructure. One major challenge is ensuring that access controls are both robust and flexible enough to accommodate the diverse and rapidly changing needs of users and applications. In a cloud environment, resources can be scaled up or down, moved across different regions, and accessed from various devices and networks. This fluidity requires a sophisticated access management system that can enforce policies consistently across all these variables.

The threats associated with this challenge are manifold. Unauthorized access is a primary concern, as it can lead to data breaches, loss of sensitive information, and potential service disruptions. Attackers can exploit misconfigurations, weak access controls, or vulnerabilities in the authentication mechanisms to gain unauthorized access. Additionally, insider threats, where legitimate users misuse their access privileges, pose a significant risk. The complexity of managing access controls across multiple cloud services and environments can result in gaps that attackers might exploit.

Existing solutions often fall short in addressing these issues comprehensively. Traditional access management systems may struggle with the scale and agility required in cloud environments. They might not provide granular enough control to enforce least privilege principles effectively, or they may lack the automation needed to keep up with the pace of changes in a cloud environment. Furthermore, integrating access management across multiple cloud providers can be cumbersome, leading to inconsistent policy enforcement and increased risk. The reliance on static credentials, such as passwords and API keys, also presents a vulnerability, as these can be compromised and exploited.

Overall, the challenge lies in creating a dynamic, scalable, and secure access management system that can adapt to the ever-changing landscape of cloud environments while mitigating the associated threats effectively.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a request to access a resource in a computing environment, the request including an action, an identifier of the resource, and an identifier of a principal. The method may also include determining an access permission required to access the resource. The method may furthermore include determining an access context based on the identifier of the principal. The method may in addition include providing the principal with the access permission to access the resource, in response to determining that a risk score associated with the access context is below a first predetermined threshold. The method may moreover include initiating a remediation action in the computing environment in response to determining that the risk score exceeds a second predetermined threshold. Other embodiments of this aspect include corresponding computer systems, apparatus, and computer programs recorded on one or more computer storage devices, each configured to perform the actions of the methods.

Implementations may include one or more of the following features. The method may include: generating a request for additional input in response to determining that the risk score is above the first predetermined threshold and lower than the second predetermined threshold. The method may include: generating the request to include authorization of a second principal having a higher access permission than the principal. The method may include: generating the request to include a multifactor authorization. The method may include: configuring the remediation action to include rejecting the request to access the resource. The method may include: generating the access context based on any one of: an user context, a resource context, a historical context, and a combination thereof. The method may include: generating a time-limited access permission; and providing the principal with the access permission as the time-limited access permission. The method may include: generating an action-limited access permission; and providing the principal with the access permission as the action-limited access permission. The method may include: generating a request to an identity and access management service to initiate the access permission. Implementations of the described techniques may include hardware, a method or process, or a computer tangible medium.

In one general aspect, non-transitory computer-readable medium may include one or more instructions that, when executed by one or more processors of a device, cause the device to: detect a request to access a resource in a computing environment, the request including an action, an identifier of the resource, and an identifier of a principal; determine an access permission required to access the resource; determine an access context based on the identifier of the principal; provide the principal with the access permission to access the resource, in response to determining that a risk score associated with the access context is below a first predetermined threshold; and initiate a remediation action in the computing environment in response to determining that the risk score exceeds a second predetermined threshold. Other embodiments of this aspect include corresponding computer systems, apparatus, and computer programs recorded on one or more computer storage devices, each configured to perform the actions of the methods.

In one general aspect, a system may include one or more processors configured to: detect a request to access a resource in a computing environment, the request including an action, an identifier of the resource, and an identifier of a principal. A system may furthermore determine an access permission required to access the resource. A system may in addition determine an access context based on the identifier of the principal. A system may moreover provide the principal with the access permission to access the resource, in response to determining that a risk score associated with the access context is below a first predetermined threshold. A system may also initiate a remediation action in the computing environment in response to determining that the risk score exceeds a second predetermined threshold. Other embodiments of this aspect include corresponding computer systems, apparatus, and computer programs recorded on one or more computer storage devices, each configured to perform the actions of the methods.

Implementations may include one or more of the following features. A system where the one or more processors are further configured to: generate a request for additional input in response to determining that the risk score is above the first predetermined threshold and lower than the second predetermined threshold. A system where the one or more processors are further configured to: generate the request to include authorization of a second principal having a higher access permission than the principal. A system where the one or more processors are further configured to: generate the request to include a multifactor authorization. A system where the one or more processors are further configured to: configure the remediation action to include rejecting the request to access the resource. A system where the one or more processors are further configured to: generate the access context based on any one of: an user context, a resource context, a historical context, and a combination thereof. A system where the one or more processors are further configured to: generate a time-limited access permission; and provide the principal with the access permission as the time-limited access permission. A system where the one or more processors are further configured to: generate an action-limited access permission; and provide the principal with the access permission as the action-limited access permission. A system where the one or more processors are further configured to: generate a request to an identity and access management service to initiate the access permission. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
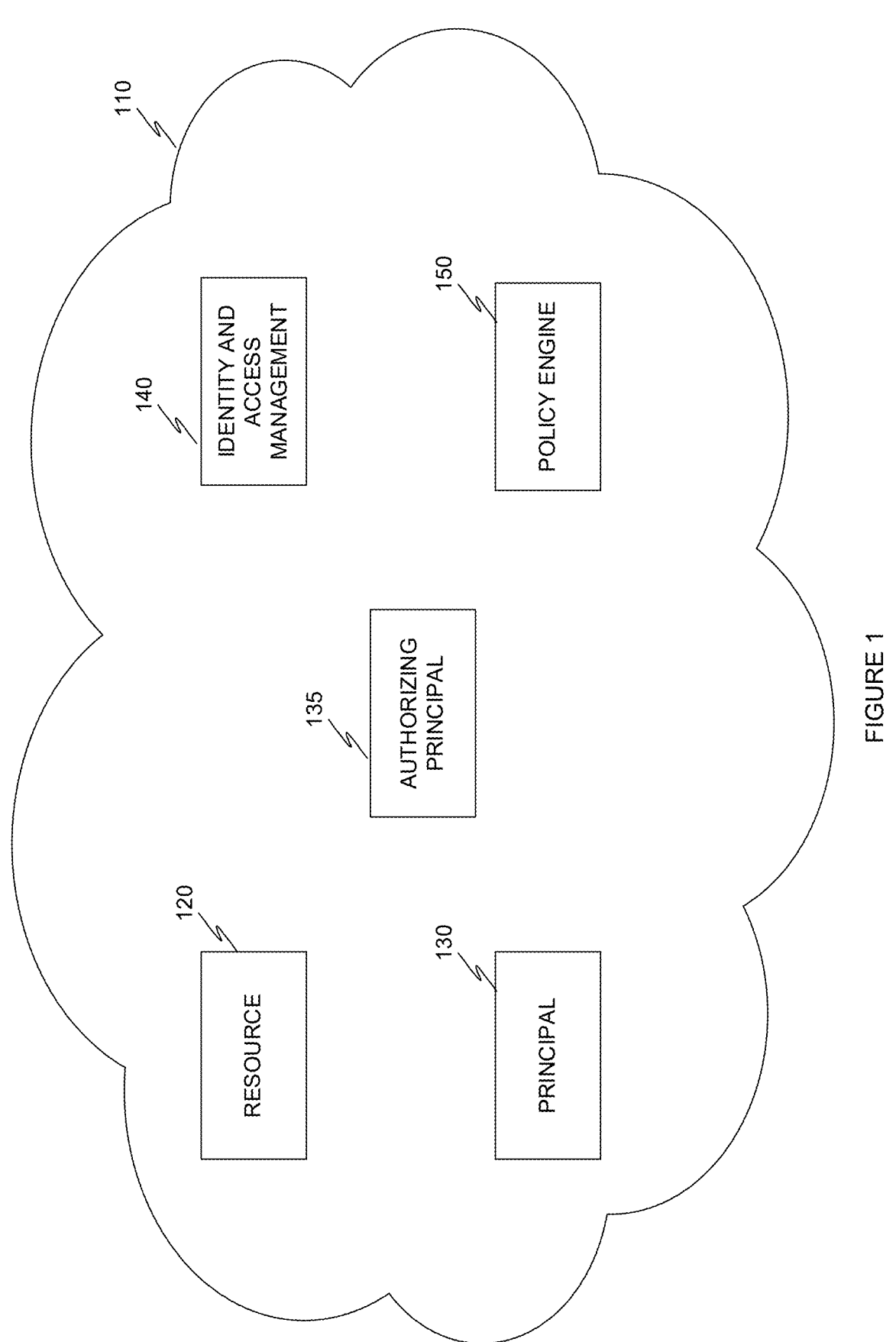
FIG. 1 is an example schematic diagram of a computing environment utilizing a policy engine for just in time access management, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment utilizing a policy engine for just in time access management, utilized to describe an embodiment. In an embodiment, a computing environment 110 includes a plurality of resources, such as resource 120.

In some embodiments, the computing environment 110 is a cloud computing environment, an on-prem environment, a hybrid environment, a combination thereof, and the like. In an embodiment, a cloud computing environment is implemented on a cloud computing infrastructure, such as Amazon® Web Service (AWS), Microsoft® Azure, Google® Cloud Platform, and the like.

In certain embodiments, the resource 120 is a physical resource, a virtual resource, a combination thereof, and the like. For example, according to an embodiment, the resource is a virtual machine, a software container, a serverless function, a combination thereof, and the like. In an embodiment, a virtual resource is a software service, a software defined application, and the like. For example, a virtual resource is a web application firewall (WAF), a gateway, a proxy server, a load balancer, a combination thereof, and the like.

In an embodiment, the computing environment 110 includes a plurality of principals, such as principal 130. In an embodiment, a principal is a computing environment entity which is authorized to act on a resource, initiate an action in the computing environment 110, a combination thereof, and the like.

According to some embodiments, a principal 130 is a user account, a service account, a user group, a network account, a local account, a combination thereof, and the like. In some embodiments, a principal 130 is associated with a permission, an authorization, a policy, and the like.

In certain embodiments, a policy, an authorization, a permission, and the like, are controlled in the computing environment by an identity and access management (IAM) service 140. In an embodiment, the IAM service 140 is configured to manage access to resources of the computing environment 110, for example by managing credentials, certificates, tokens, and the like, which are utilized for managing access, initiating actions, and the like, with respect to resources, such as resource 120. For example, in an embodiment, the IAM service 140 is implemented utilizing Okta®.

In an embodiment, an authorizing principal 135 is a principal of the computing environment 110 which includes a higher level of permission than the principal 130. For example, in an embodiment, the principal 130 is a user account, while the authorizing principal 135 is an administrator account.

In some embodiments, an authorizing principal 135 is provided with a permission to grant access, permission, etc., to another principal, such as principal 130. In an embodiment, the access, permission, etc., is a temporary access.

In an embodiment, the computing environment 110 further includes a policy engine 150. According to an embodiment, the policy engine 150 is configured to generate access policies, policy exceptions, determine a risk associated with a permission, a combination thereof, and the like.

According to certain embodiments, access is granted to resources based on a determined need. This is advantageous, as resources are by default not accessible, and such access is required only for certain actions.

For example, in an embodiment, a resource 120 is not accessible to a principal 130. In this embodiment, the resource 120 suffers a malfunction, misconfiguration, requires a software update, etc., which needs to be performed by the principal 130. It would therefore be advantageous to provide access to the principal 130 to the resource 120 in order to initiate this action.

In some embodiments, the policy engine 150 is configured to receive an access request from a principal 130. In an embodiment, the request includes an identifier of the principal 130, an identifier of an action, an identifier of a resource, a combination thereof, and the like.

According to an embodiment, the policy engine 150 is configured to generate a context based on the received request, and determine whether to initiate granting of a permission, a temporary permission, etc., to the principal 130.

Figure 2:
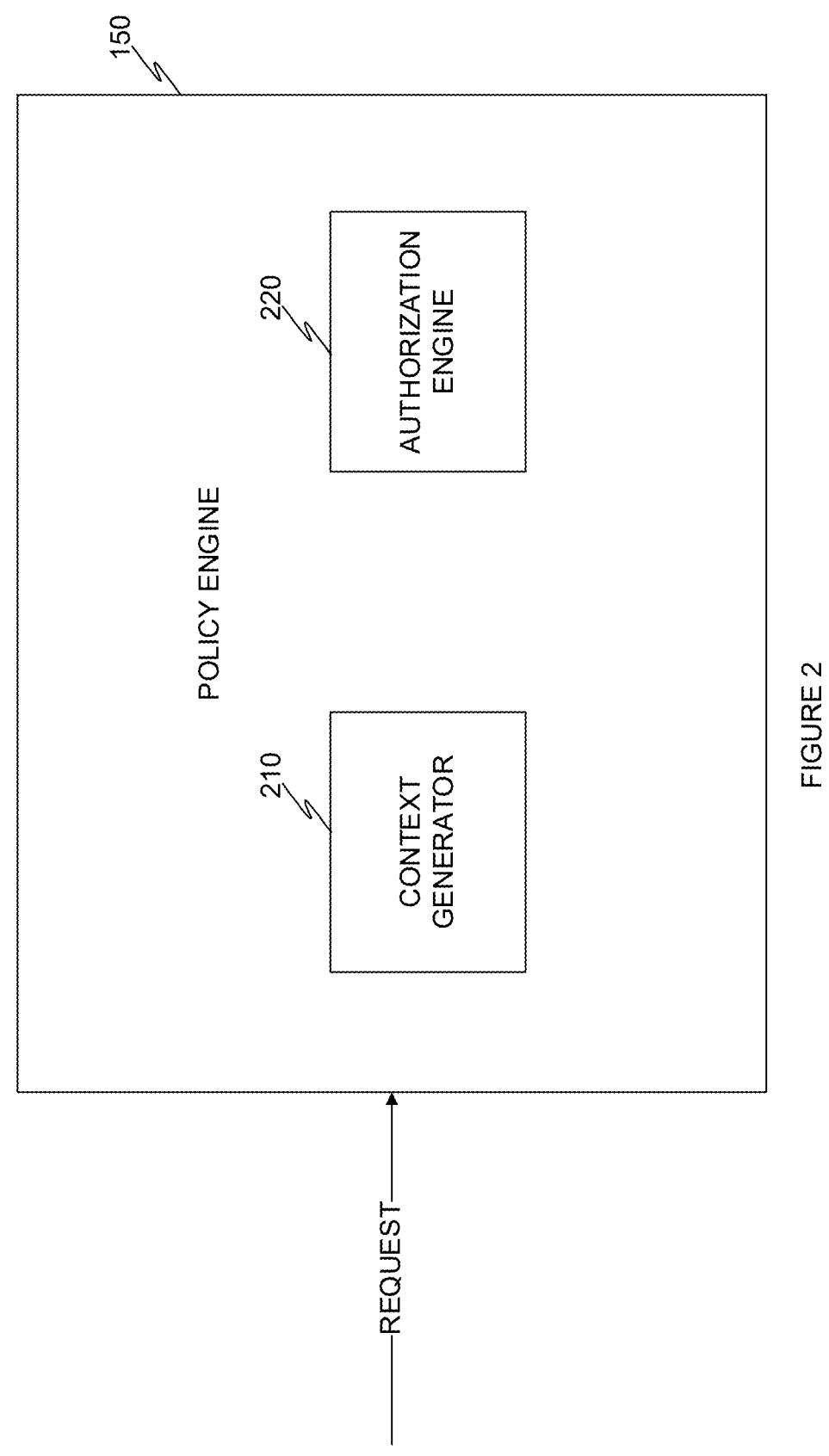
FIG. 2 is an example schematic diagram of a policy engine for providing just-in-time access, implemented in accordance with an embodiment.

FIG. 2 is an example schematic diagram of a policy engine for providing just-in-time access, implemented in accordance with an embodiment. In an embodiment, a just-in-time access refers to providing an access, a permission, etc., only when it is needed and when it is deemed to be required. This reduces, according to an embodiment, incidents of excessive permissions, for example, and therefore reduces cybersecurity threats.

In an embodiment, a policy engine 150 is configured to receive a request to access a resource. For example, in an embodiment, the request includes an identifier of a principal (e.g., a user account, a service account, a role, a user group, a combination thereof, and the like.

In some embodiments, the request further includes an identifier of the resource, an IP address of the resource, an identifier of the resource group (e.g., software container identifier, auto-scaling group identifier, etc.), an identifier of a virtual private cloud (VPC) in which the resource is deployed, an identifier of a virtual private network (VPN) associated with the resource, an identifier of a virtual network (VNet) associated with the resource, a combination thereof, and the like.

In certain embodiments, the request includes an action. For example, in an embodiment, the request includes an action, a computer instruction, an identifier of a software package for installation on the resource, etc. In some embodiments, the action is initiated on the resource, with respect to the resource, etc.

In various embodiments, the policy engine 150 is implemented as a virtual resource, such as a virtual machine, on a software container platform, a serverless function, a combination thereof, and the like. In an embodiment, the policy engine 150 includes a context generator 210, and an authorization engine 220.

In an embodiment, the context generator 210 is configured to generate a context based on the received request. In some embodiments, the context generator 210 is implemented as a software module of the policy engine 150.

In certain embodiments, the context generator 210 is configured to generate a context based on a justification. For example, in an embodiment, a justification is generated by extracting data related to the resource, the action, the principal, a combination thereof, and the like.

In some embodiments, the principal is assigned to resolve a ticket in an issue tracking system, such as Jira®. In an embodiment, the ticket includes an identifier of the resource. In certain embodiments, the justification is the ticket, which includes the identifier of the user account assigned with resolving the issue, an identifier of the resource, and an identifier of the issue.

For example, in an embodiment, the context is generated based on the justification, which is information, data, and the like, utilized to generate the context. In some embodiments, the request includes a permission which is excessive based on the justification. For example, where the principal generates a request including a permission to initiate an action which is more than required to resolve an issue indicated by the ticket, such a request is denied, according to an embodiment.

In some embodiments, context is generated based on data records which are stored based on previous accesses, actions, and the like. For example, in an embodiment, a user account which was previously granted access to resolve an issue, is granted access again when the issue occurs, for example on another resource.

In certain embodiments, the context generator 210 is further configured to generate a context based on a risk score. For example, in an embodiment, a risk is determined based on providing access to the principal. In an embodiment, the risk is determined based on a number of principals which have access to the resource, a type of principal that has access to the resource, a combination thereof, and the like.

In an embodiment, an authorization engine 220 is configured to generate requests for authorization. For example, in an embodiment, the authorization engine 220 is configured to determine, based on the generated context from the context generator 210, what permission, if at all, to grant the requesting principal.

According to an embodiment, the authorization engine 220 is further configured to generate the request for authorization based on a time value, an action count, another permission, a combination thereof, and the like. For example, in an embodiment, a time value is a time limit, a time window, etc. In some embodiments, an action count is a certain predetermined number of actions the principal is authorized to perform before such actions are blocked, require reauthorization, etc.

In an embodiment, the authorization engine 220 is configured to generate a request for additional permissions. For example, in some embodiments, the authorization engine is configured to apply a policy, a rule, a heuristic, a combination thereof, and the like. In an embodiment, the policy, when applied, configures the authorization engine 220 to generate a request to another principal, such as the authorizing principal 135, to grant permission to the requesting principal.

In some embodiments, the authorization engine 220 is configured to generate a request for additional credentials from the user account. For example, in an embodiment, the authorization engine 220 is configured to generate a request for a multi-factor authentication, a certificate, a token, a combination thereof, and the like.

Figure 3:
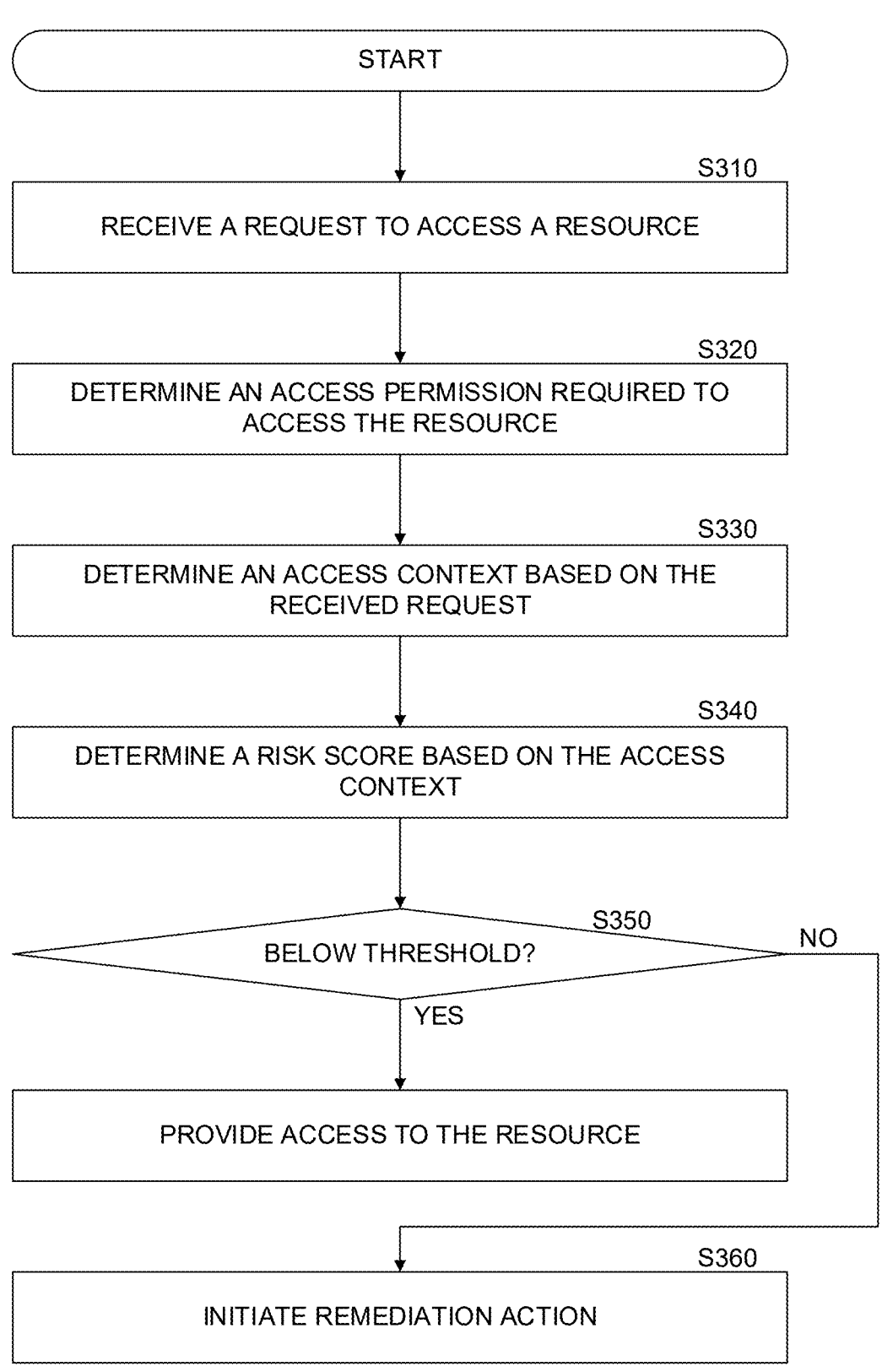
FIG. 3 is an example flowchart of a method for providing just-in-time access to resources in a computing environment, implemented in accordance with an embodiment.

FIG. 3 is an example flowchart of a method for providing just-in-time access to resources in a computing environment, implemented in accordance with an embodiment. According to some embodiments, it is advantageous to generate various contexts based on a received request for access, and apply a policy, a heuristic, a rule, etc., on the generated contexts, to determine what authorization, if any, to provide the requesting principal.

At S310, a request is detected for accessing a resource. In an embodiment, the request is received, for example by a policy engine, an identity and access management (IAM) server, and the like. In some embodiments, the resource is a physical resource, a virtual resource, a software application, a software binary, a version control system, an issue tracking system ticket, a software repository, various combinations thereof, and the like.

In an embodiment, the request includes an identifier of a principal, an identifier of a resource, and an action. In some embodiments, the action is a request to access the resource. In certain embodiments, the action includes computer code, for example executable by the resource.

In some embodiments, the action is initiated by the principal in the computing environment. For example, the action is initiated on the resource, respective of the resource, a combination thereof, and the like.

According to an embodiment, the computing environment is a cloud computing environment, an on-prem environment, a hybrid environment, a combination thereof, and the like. In some embodiments, the action is initiated via an application programming interface (API) of the computing environment.

In an embodiment, the request includes an identifier of a principal, such as a username of a user account. In certain embodiments, the request includes a user group, role, and the like, associated with the principal. In some embodiments, the user group, role, and the like, are determined based on the user account identifier, for example by querying an IAM service.

According to an embodiment, an identifier of a resource includes a resource name, an identifier of a resource group (e.g., identifier of a software container cluster, identifier of an auto-scaling group, etc.), an IP address, an IP address range, a VPC identifier, a VNet identifier, a VPN identifier, a combination thereof, and the like.

At S320, an access permission is determined. In an embodiment, the access permission is determined based on the action detected in the request. In some embodiments, the access permission is determined based on a permission required to execute, to initiate, etc., the action in the computing environment by the principal generating the request.

In an embodiment, determining an access permission is not granting of the permission. According to such embodiments, determining involves determining which permission, set of permissions, policy exceptions, and the like, are required in order to grant the request for access.

In some embodiments, a permission is granted to an individual user. In certain embodiments, permission is granted by generating an exception on a policy for a specific user.

At S330, an access context is generated. In an embodiment, an access context includes a principal context, a resource context, a risk context, a historical context, a combination thereof, and the like.

In some embodiments, the principal context is generated based on an identifier of the principal in the request. In an embodiment, the principal context is generated based on existing permissions of the principal, existing user group, existing user role, and the like, which are associated with the principal In certain embodiment, the principal context is generated by querying an IAM service to determine data, metadata, etc., respective of the principal. For example, in an embodiment, an age is determined for a user account of the principal. This is advantageous as in an embodiment, a newer account is considered higher risk than a more established account.

In an embodiment, a resource context is generated based on data, metadata, and the like, of the resource. For example, in an embodiment, a resource associated with sensitive data (e.g., personal identifiable information—PII) is more sensitive than a database containing anonymized data.

In some embodiments, resource context includes access granted to the resource, identifiers of authors of code objects utilized to deploy the resource, and the like. In an embodiment, resource context includes a policy, a rule, and the like, which is associated with the resource, a group of resources, and the like.

In certain embodiments, historical context includes prior actions performed, initiated, etc., by the principal. For example, in an embodiment, historical context is generated based on a plurality of actions performed by the principal, performed on the resource, performed on a similar resource, performed to address the same issue a resource is experiencing, a combination thereof, and the like.

At S340, a risk score is generated. In an embodiment, a risk context is generated based on the principal, the resource, the action, a combination thereof, and the like. For example, in an embodiment, a risk based on the principal is determined based on the age of the user account, whether the user account initiated such actions in the past, whether such actions were authorized in the past with respect to the user account, whether such actions were denied in the past with respect to the user account, whether the permission allows to initiate more actions other than what is required (e.g., admin permission vs. role permission), a combination thereof, and the like.

According to an embodiment, risk context is further generated based on the resource, a content stored on the resource, secondary resources accessible by accessing the resource, a vulnerability, a misconfiguration, an exposure, a combination thereof, and the like.

At S350, a check is performed to determine if access should be granted. If 'yes', execution continues at S360. If 'no', execution continues at S370.

At S360, an access permission is granted to the principal. In an embodiment, granting access permission includes configuring an identity and access management (IAM) service with a policy, a rule, a condition, and the like, based on the determined access permission.

In some embodiments, the access permission is granted for a limited period of time. In certain embodiments, the access permission is granted for a limited number of actions. In an embodiment, the access permission is granted for a limited period of time, for a limited number of actions, for a combination thereof, and the like.

In an embodiment, a permission is granted based on a condition. For example, according to an embodiment, the permission is granted based on a ticket of an issue tracking system, and the permission remains in effect while the issue remains.

According to some embodiments, the permission is granted in response to determining that a risk score, for example determined based on the generated context, is below a predetermined threshold. In an embodiment, where the risk score is above a predetermined level but below a second predetermined level, a secondary authentication is performed.

For example, in an embodiment, a secondary authentication includes a request for multifactor authentication (MFA), a request to authenticate with an authorizing principal (e.g., an administrator account), a combination thereof, and the like. In an embodiment, the authorizing principal includes a permission, a permission set, and the like, which is higher than the permission, permission set, etc., of the requesting principal.

At S370, access is denied. In an embodiment, access is denied based on the generated context. In some embodiments, access is denied based on a determination that a risk score, for example generated based on the generated context, is above a predetermined threshold value.

In an embodiment, a remediation action is initiated in response to determining that the access should be denied. In some embodiments, the remediation action includes generating a notification that the request is denied, removing a permission, revoking an access, a combination thereof, and the like.

Figure 4:
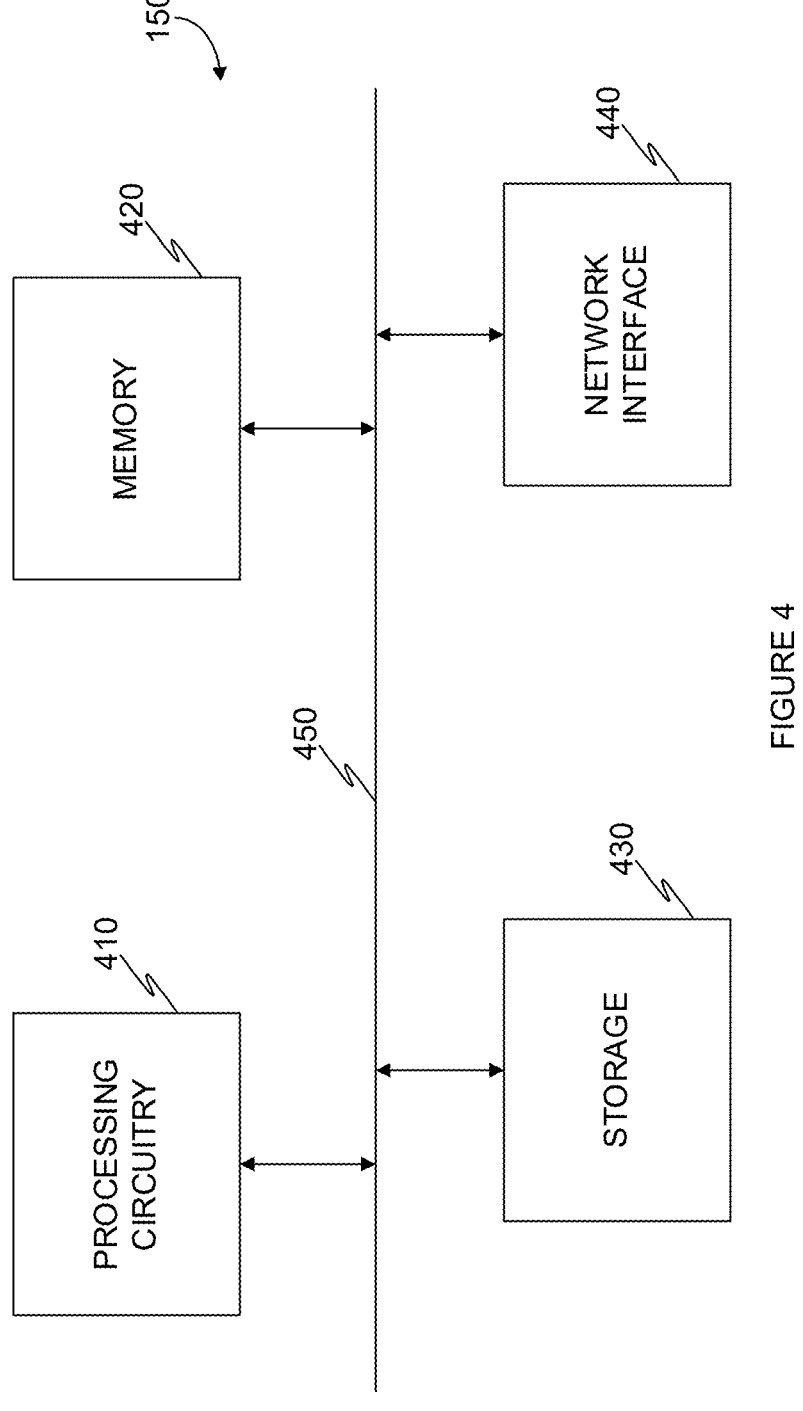
FIG. 4 is an example schematic diagram of a policy engine according to an embodiment.

FIG. 4 is an example schematic diagram of a policy engine 150 according to an embodiment. The policy engine 150 includes, according to an embodiment, a processing circuitry 410 coupled to a memory 420, a storage 430, and a network interface 440. In an embodiment, the components of the policy engine 150 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the policy engine 150 with communication with, for example, the computing environment 110, the IAM service 140, the authorizing principal 135, and the like, according to an embodiment.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing context-based access to managed resources in a computing environment, comprising:

detecting a request to access a resource in a computing environment, the request including an action, an identifier of the resource, and an identifier of a principal;

determining an access permission required to access the resource;

determining an access context based on: the identifier of the principal, a user context, a resource context, and a historical context;

providing the principal with the access permission to access the resource, in response to determining that a risk score associated with the access context is below a first predetermined threshold; and initiating a remediation action in the computing environment in response to determining that the risk score exceeds a second predetermined threshold.

2. The method of claim 1, further comprising:

generating a request for additional input in response to determining that the risk score is above the first predetermined threshold and lower than the second predetermined threshold.

3. The method of claim 2, further comprising:

generating the request to include authorization of a second principal having a higher access permission than the principal.

4. The method of claim 2, further comprising:

generating the request to include a multifactor authorization.

5. The method of claim 1, further comprising:

configuring the remediation action to include rejecting the request to access the resource.

6. The method of claim 1, further comprising:

generating a time-limited access permission; and providing the principal with the access permission as the time-limited access permission.

7. The method of claim 1, further comprising:

generating an action-limited access permission; and providing the principal with the access permission as the action-limited access permission.

8. The method of claim 1, further comprising:

generating a request to an identity and access management service to initiate the access permission.

9. The method of claim 1, wherein the historical context includes any one of: a prior action initiated by the principal, an action initiated on the resource, an action initiated on a similar resource, and any combination thereof.

10. A non-transitory computer-readable medium storing a set of instructions for providing context-based access to managed resources in a computing environment, the set of instructions comprising:

one or more instructions that, when executed by one or more processors of a device, cause the device to:

detect a request to access a resource in a computing environment, the request including an action, an identifier of the resource, and an identifier of a principal;

determine an access permission required to access the resource;

determine an access context based on: the identifier of the principal, a user context, a resource context, and a historical context;

provide the principal with the access permission to access the resource, in response to determining that a risk score associated with the access context is below a first predetermined threshold; and initiate a remediation action in the computing environment in response to determining that the risk score exceeds a second predetermined threshold.

11. A system for providing context-based access to managed resources in a computing environment comprising:

one or more processors configured to:

detect a request to access a resource in a computing environment, the request including an action, an identifier of the resource, and an identifier of a principal;

determine an access permission required to access the resource;

determine an access context based on: the identifier of the principal, a user context, a resource context, and a historical context;

provide the principal with the access permission to access the resource, in response to determining that a risk score associated with the access context is below a first predetermined threshold; and initiate a remediation action in the computing environment in response to determining that the risk score exceeds a second predetermined threshold.

12. The system of claim 11, wherein the one or more processors are further configured to:

generate a request for additional input in response to determining that the risk score is above the first predetermined threshold and lower than the second predetermined threshold.

13. The system of claim 12, wherein the one or more processors are further configured to:

generate the request to include authorization of a second principal having a higher access permission than the principal.

14. The system of claim 12, wherein the one or more processors are further configured to:

generate the request to include a multifactor authorization.

15. The system of claim 11, wherein the one or more processors are further configured to:

configure the remediation action to include rejecting the request to access the resource.

16. The system of claim 11, wherein the one or more processors are further configured to:

generate a time-limited access permission; and provide the principal with the access permission as the time-limited access permission.

17. The system of claim 11, wherein the one or more processors are further configured to:

generate an action-limited access permission; and provide the principal with the access permission as the action-limited access permission.

18. The system of claim 11, wherein the one or more processors are further configured to:

generate a request to an identity and access management service to initiate the access permission.

* * * * *